(12) United States Patent
Lim

(10) Patent No.: US 6,935,649 B2
(45) Date of Patent: Aug. 30, 2005

(54) FOLDABLE TRICYCLE

(76) Inventor: Cheol Wang Lim, Jo-Yoo APT 106-Dong 6096-Ho, 740 Goajung 1-Dong, Sahagoo, Busan (KR)

(*) Notice: Subject to any disclaimer, the term of this patent is extended or adjusted under 35 U.S.C. 154(b) by 0 days.

(21) Appl. No.: 10/658,620

(22) Filed: Sep. 9, 2003

(65) Prior Publication Data

US 2004/0061304 A1 Apr. 1, 2004

(30) Foreign Application Priority Data

Sep. 10, 2002 (KR) .................................. 20-2002-0027091

(51) Int. Cl.[7] .................................................. B62K 1/00
(52) U.S. Cl. ........................ 280/278; 280/282; 280/287
(58) Field of Search ................................ 280/282, 287, 280/278, 279; 74/551.1

(56) References Cited

U.S. PATENT DOCUMENTS

| | | | | |
|---|---|---|---|---|
| 4,079,957 A | * | 3/1978 | Blease | 280/278 |
| 5,279,181 A | * | 1/1994 | Boudreau | 74/551.1 |
| 5,553,879 A | * | 9/1996 | Niemeyer et al. | 280/279 |
| 6,120,048 A | * | 9/2000 | Li | 280/270 |
| 6,152,473 A | * | 11/2000 | Shih | 280/278 |
| 6,161,847 A | * | 12/2000 | Howell et al. | 280/30 |
| 6,286,848 B1 | * | 9/2001 | Augustin | 280/287 |
| 6,431,567 B2 | * | 8/2002 | Tsai | 280/87.041 |
| 6,530,589 B1 | * | 3/2003 | Ma | 280/278 |
| 6,575,486 B2 | * | 6/2003 | Ma | 280/287 |
| 6,609,723 B2 | * | 8/2003 | Chuang | 280/287 |
| 6,612,598 B2 | * | 9/2003 | Wu | 280/270 |

FOREIGN PATENT DOCUMENTS

KR 20-2002-0027091 9/2002

* cited by examiner

Primary Examiner—Daniel G. DePumpo
(74) Attorney, Agent, or Firm—Park & Sutton LLP; John K. Park

(57) ABSTRACT

A foldable tricycle includes a center frame, a front frame to which a front wheel is rotatably attached, a rear frame to which two rear wheels are rotatably attached, and a four-bar link including a first bar that is integrated with the front frame, a second bar that is integrated with the center frame, a third bar that is integrated with the rear frame, and a fourth bar. The fourth bar has a shape of plates and covers the other bars while the link operates between an unfolded position and a folded position. Lockers that locks the link in either the unfolded position or the folded position are provided and include a pin, two recesses that receives the pin, and a tension spring that presses the pin into the recesses. A semi-circle guide guides the pin between the two positions and also covers the third bar.

3 Claims, 6 Drawing Sheets

FOLDABLE TRICYCLE

BACKGROUND OF THE INVENTION

The present invention relates to a foldable tricycle. More particularly, this invention relates to a foldable tricycle having a middle portion between the front wheel and the rear wheels, and the middle portion is collapsible to facilitate storage and transportation of the tricycle.

A tricycle is widely used as a toy for a baby or a young child. Due to the bulky size of the tricycle, it was difficult to find a storage space for the tricycle within a house. It was also difficult to carry the tricycle by a passenger car since it did not usually fit into the trunk compartment. Foldable tricycles having a foldable front frame, or a foldable rear frame, have been devised. However, such foldable tricycles are not efficient in reducing the size. Also injury to hands or fingers occurred by being pinched between moving parts while folding the tricycles.

SUMMARY OF THE INVENTION

The present invention contrives to solve the disadvantage of the prior art.

An objective of the invention is to provide a foldable tricycle that can be folded at the middle portion to reduce the size and to facilitate storage and transportation.

Another objective of the invention is to provide a safe folding mechanism for a foldable tricycle.

Still another objective of the invention is to provide a convenient fastening means for assembling a handle bar and a front wheel fork.

Still another objective of the invention is to provide a foldable tricycle that has a means for conveniently pushing the tricycle.

Still another objective of the invention is to provide a foldable tricycle that has a pivotable stepping plate to facilitate stepping on the tricycle and seating on a saddle.

To achieve the above objectives, a foldable tricycle according to the present invention includes a center frame to which a saddle is fixed, a front frame to which a front wheel is rotatably attached, a rear frame to which one or more rear wheels are rotatably attached, and a four-bar link including a first bar, a second bar, a third bar, and a fourth bar.

The first bar is integrated with the front frame; the second bar is integrated with the center frame; and the third bar is integrated with the rear frame. The fourth bar connects between the first bar and the third bar, and the four-bar link moves between a folded position in which the distance between the front wheel and the rear wheels is shortest, and a unfolded position in which the distance between the front wheel and the rear wheels is longest.

The foldable tricycle further includes a first lock that locks the four-bar link at the unfolded position, and a second lock that locks the four-bar link at the folded position.

The first lock includes a first lock recess provided in the center frame, a link pin provided on the rear frame, and a lock tension spring. The first lock recess receives the link pin at the unfolded position. The second lock includes a second lock recess provided in the center frame. The second lock recess receives the link pin at the folded position. The lock tension spring is connected between the second bar and the fourth bar and applies tension force between the second bar and the fourth bar so that the four-bar link is kept either in the unfolded position or on the folded position.

The first lock may further include a lock pin fixed to he center frame, and a lever pivotally attached to the rear frame and having a hook that engages with the lock pin.

The center frame further includes a guide between the first rock recess and the second lock recess. The guide has a shape of a half-circle, and guides the movement of the link pin between the unfolded position and the folded position.

The center frame has a channel, wherein the first bar and the third bar move into and out of the channel as the four-bar link moves between the folded position and the unfolded position.

The fourth bar comprises one or more flat panels that cover the first bar, the second bar and the third bar.

The foldable tricycle further includes a handle bar for steering the foldable tricycle, a front wheel fork that rotatably supports the front wheel, a fastening member that fastens the handle bar the front wheel fork, and a front bearing member that rotatably supports the handle bar and the front wheel fork, and is fixed to the front frame.

The fastening member includes an annular fastening body into which the handle bar and the front wheel fork are inserted, and a fastening element that passes through a handle hole provided in the handle bar, a fork hole provided in the front wheel fork, and a fastening member hole provided in the fastening body. The fastening element includes a bolt and a nut that engages with the bolt.

The front wheel fork further includes an aligning recess, and the fastening member further comprises an aligning projection that engages with the aligning recess. When the aligning projection is engaged with the aligning recess, the fork hole and the fastening member hole are aligned with each other.

The foldable tricycle further includes a stepping plate that is pivotally attached to the center frame. The stepping plate facilitates user's seating on the saddle, and pivoted upward after seating in order not to interfere with the user's legs.

The foldable tricycle further includes a back support for supporting the back of a rider, and a pushing bar for facilitating pushing of the foldable tricycle. The back support is fixed to the center frame, and the pushing bar is detachably attached to the back support. The pushing bar includes a rod that is fixed to the back support at one end and an elliptical handle that is fixed to the other end of the rod.

The advantages of the present invention are: (1) a foldable tricycle that has a safe and efficient folding mechanism is provided; (2) the folding mechanism has cover plates that prevent pinching of fingers or other portion of a human body; (3) assembly of the handle bar and the front wheel fork is simple and convenient; (4) the pushing bar facilitates pushing and pulling of the tricycle; and (5) the stepping plate make it easy to seat on the saddle, and does not interfere with legs.

Although the present invention is briefly summarized, the fuller understanding of the invention can be obtained by the following drawings, detailed description and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
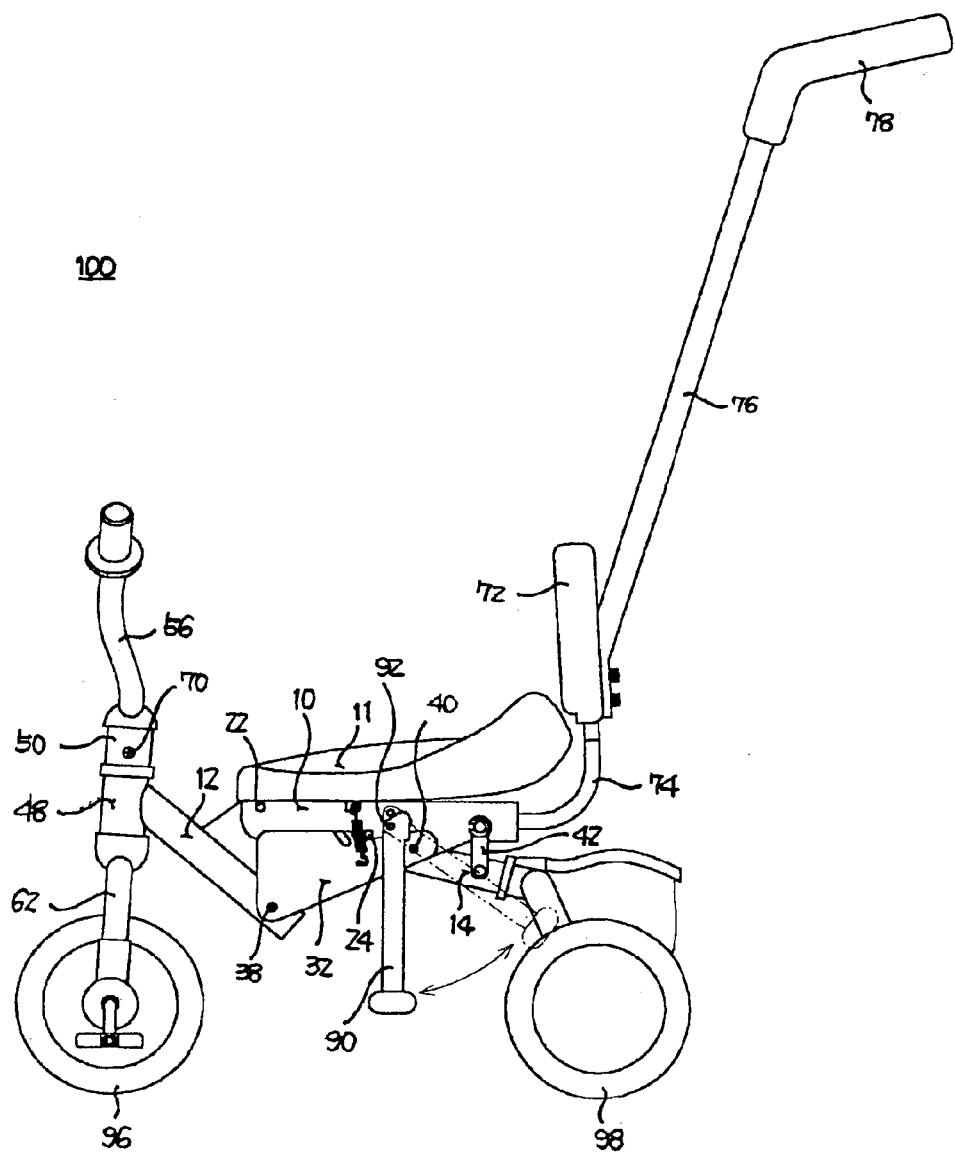
FIG. 1 is an elevation view of a foldable tricycle according to the present invention.

FIG. 1 shows a foldable tricycle 100 of the present invention. The foldable tricycle 100 includes a center frame 10 to which a saddle 11 is fixed, a front frame 12 to which a front wheel 96 is rotatably attached, a rear frame 14 to which two rear wheels 98 are rotatably attached, and a four-bar link 200 (refer to FIG. 2) including a first bar 202, a second bar 204, a third bar 206, and a fourth bar 208.

Figure 2:
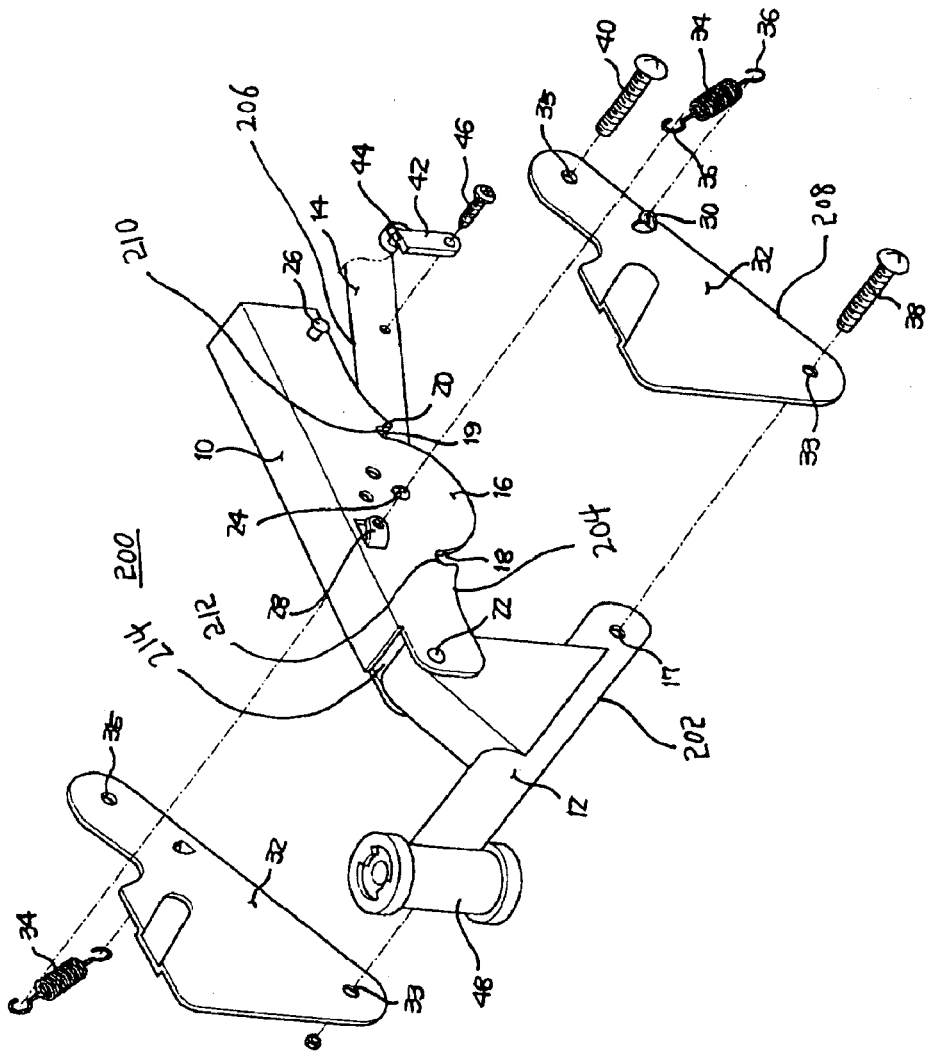
FIG. 2 is a perspective view of a four-bar link that enables folding of the tricycle.
Figure 5:
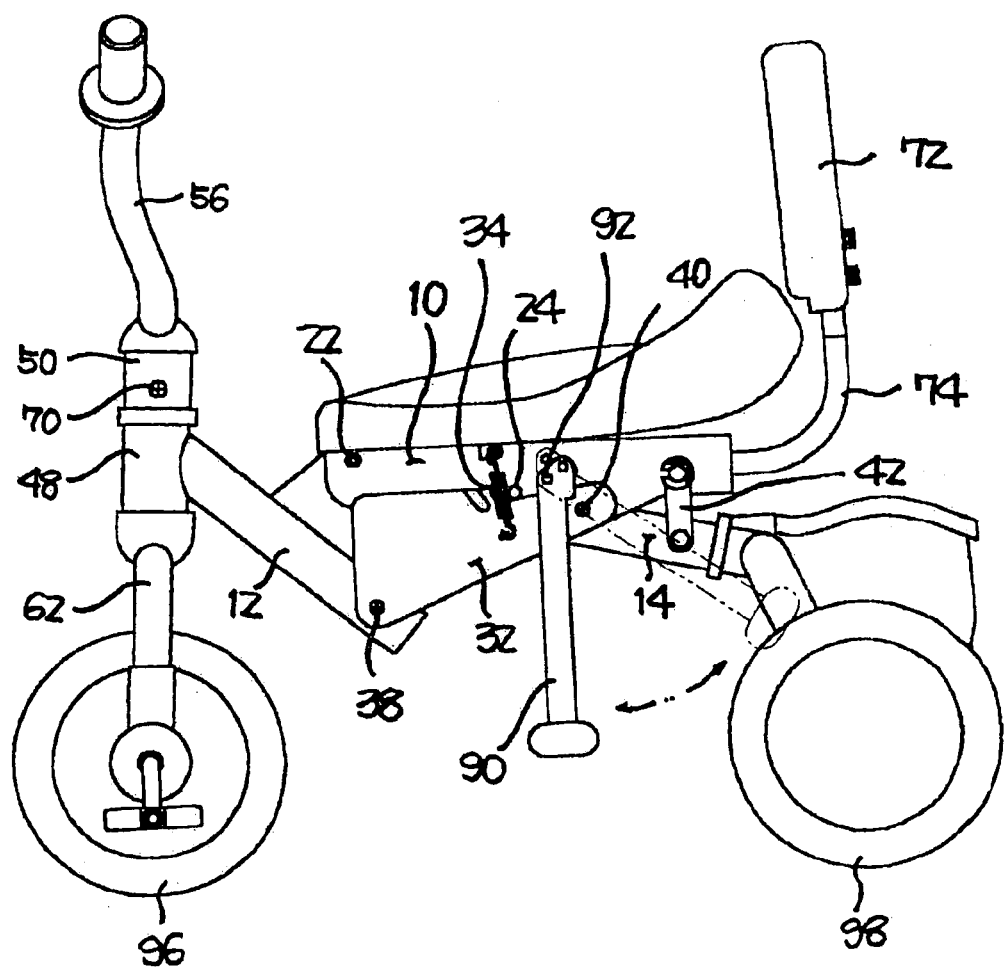
FIG. 5 is an elevation view of the tricycle in an unfolded state.
Figure 6:
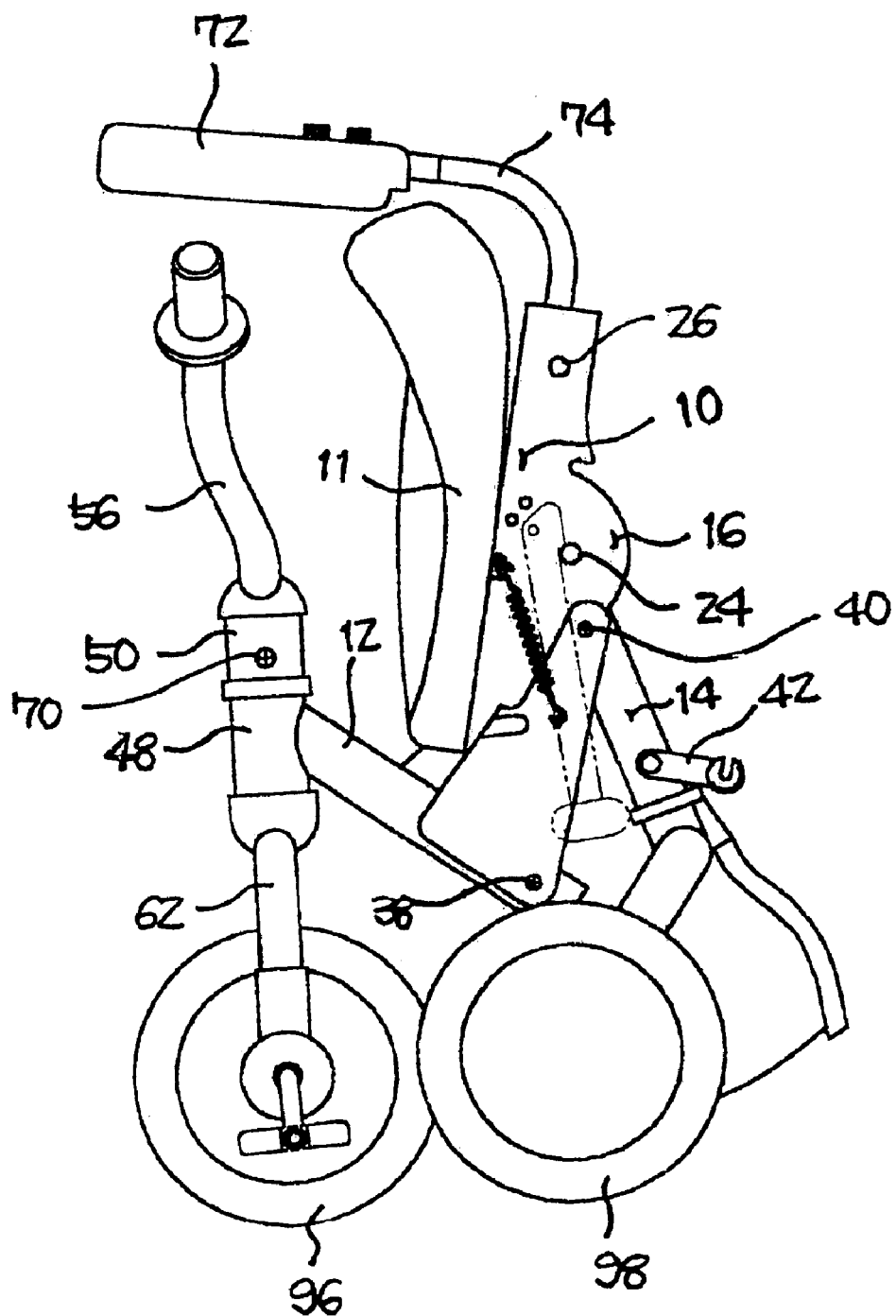
FIG. 6 is an elevation view of the tricycle in a folded state.

As shown in FIG. 2, the first bar 202 is integrated with the front frame 12; the second bar 204 is integrated with the center frame 10; and the third bar 206 is integrated with the rear frame 14. The fourth bar 208 connects between the first bar 202 and the third bar 206. The four-bar link 200 moves between a folded position in which the distance between the front wheel 96 and the rear wheels 98 is shortest as shown in FIG. 6, and a unfolded position in which the distance between the front wheel 96 and the rear wheels 98 is longest as shown in FIG. 5.

The foldable tricycle further includes a first lock 210 that locks the four-bar link 200 at the unfolded position, and a second lock 212 that locks the four-bar link 200 at the folded position.

The first lock 210 includes a first lock recess 20 provided in the center frame 10, a link pin 40 provided on the rear frame 14, and a lock tension spring 34. The first lock recess 20 receives the link pin 40 at the unfolded position. The second lock 212 includes a second lock recess 18 provided in the center frame 10. The second lock recess 18 receives the link pin 40 at the folded position. The lock tension spring 34 is connected between the second bar 204 and the fourth bar 208 and applies tension force between them so that the four-bar link 200 is kept either in the unfolded position or on the folded position.

The first lock 210 further includes a lock pin 26 fixed to the center frame 10, and a lever 42 pivotally attached to the rear frame 14 with a screw 46, and having a hook 44 that engages with the lock pin 26. In this way, accidental folding of the tricycle 100 is prevented.

The center frame 10 further includes a guide 16 between the first rock recess 20 and the second lock recess 18. The guide 16 has a shape of a half-circle, and guides the movement of the link pin 40 between the unfolded position and the folded position.

The center frame 10 has a U-shaped channel 214, and the first bar 202 and the third bar 206 partially move into and out of the channel 214 as the four-bar link 200 moves between the folded position and the unfolded position. Within the channel 214, the front frame 12 is pivotally attached at a first pivot axis 22, and the rear frame 14 is pivotally attached at a second pivot axis 24.

The fourth bar 208 comprises two flat panels 32 that partially cover the first bar 202, the second bar 204 and the third bar 206. The panels 32 are attached with a fastener 38, and the link pin 40. The fastener 38 and the link pin 40 are installed through holes 33, 35 that are provided on both ends of the panel 32, a hole 17 formed in the front frame 12, and a hole 19 formed in the rear frame 14. The lock tension spring 34 has two hooks 36 that engage with a bracket 28 formed on the side of the center frame 10 and a bracket 30 formed on the panel 32. A bolt or pin, etc. may be used as the fastener 38 and the link pin 40.

Figure 3:
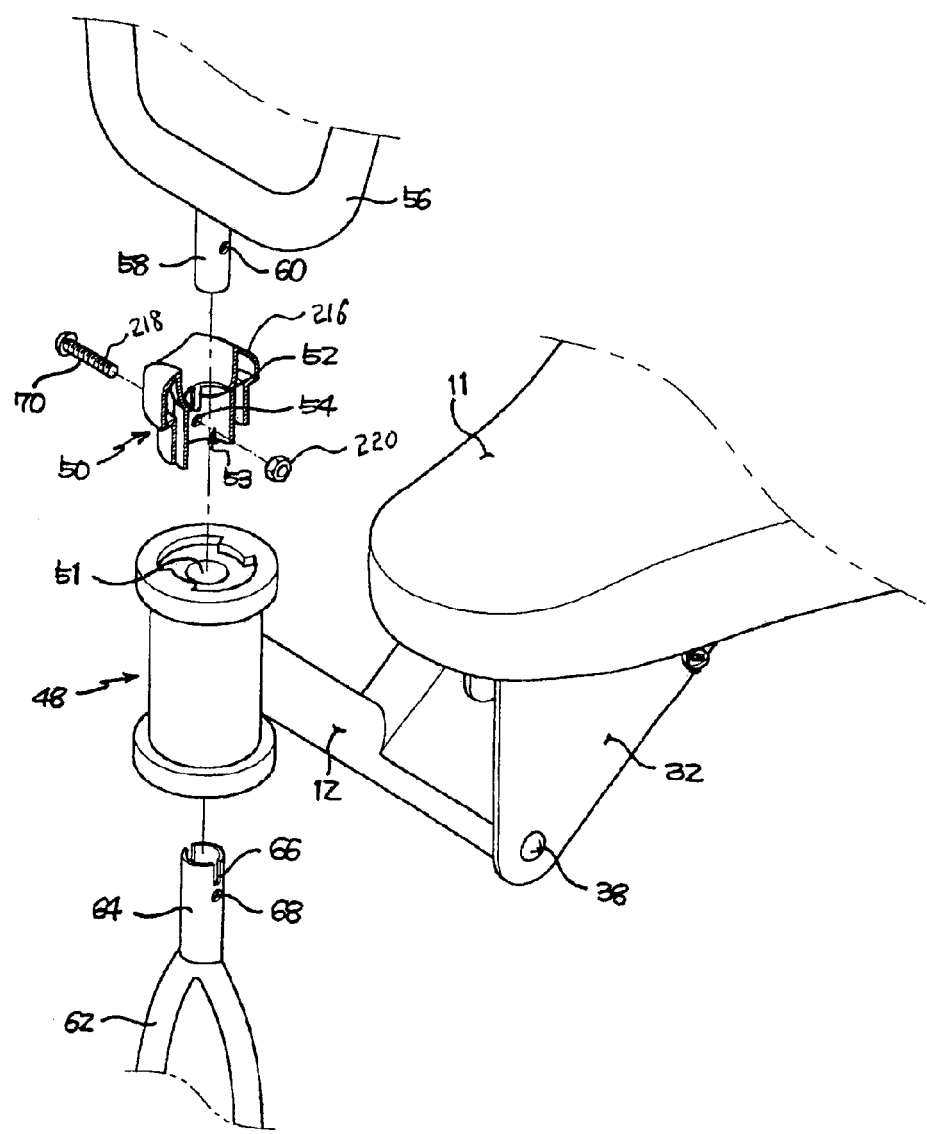
FIG. 3 is a perspective view illustrating how a handle bar and a front wheel fork are assembled with a front frame.

As shown in FIG. 3, the foldable tricycle 100 further includes a handle bar 56 for steering the foldable tricycle 100, a front wheel fork 62 that rotatably supports the front wheel 96, a fastening member 50 that fastens the handle bar 56 and the front wheel fork 62, and a front bearing member 48 that rotatably supports the handle bar 56 and the front wheel fork 62 and fixed to the front frame 12.

The fastening member 50 includes an annular fastening body 216 into which the handle bar 56 and the front wheel fork 62 are inserted, and a fastening element 70 that passes through a handle hole 60 provided in the handle bar 56, a fork hole 68 provided in the front wheel fork 62, and a fastening member hole 54 provided in the fastening body 216. The fastening element 70 includes a bolt 218 and a nut 220 that engages with the bolt 218.

The front bearing member 48 has a cylindrical shape, and the fastening member 50 is received on top of the front bearing member 48. A through hole 51 is formed in the center of the front bearing member 48. A vertical rod 64 of the front wheel fork 62 is passes through the through hole 51 and partially protrudes from the through hole 51. The partially protruded vertical rod 64 is inserted into a lower portion of a through hole 53 of the fastening member 50. An insertion rod 58 of the handle bar 56 is inserted into an upper portion of the through hole 53, and at this position, the insertion rod 58 is inserted into the vertical rod 64. The fastening member 50, the insertion rod 58, and the vertical rod 64, which have been assembled in this way, are fastened by the fastening element 70.

The front wheel fork 62 further includes an aligning recess 66, and the fastening member 50 further includes an aligning projection 52 that engages with the aligning recess 66. When the aligning projection 52 is engaged with the aligning recess 66, the fork hole 68 and the fastening member hole 54 are aligned with each other, thereby facilitating assembly of the fastening element 70.

The foldable tricycle 100 further includes a stepping plate 90 that is pivotally attached to the center frame 10 at a pivot axis 92 in the middle of the center frame 10. The stepping plate 90 facilitates user's seating on the saddle 11, and pivoted upward after seating in order not to interfere with the user's legs.

Figure 4:
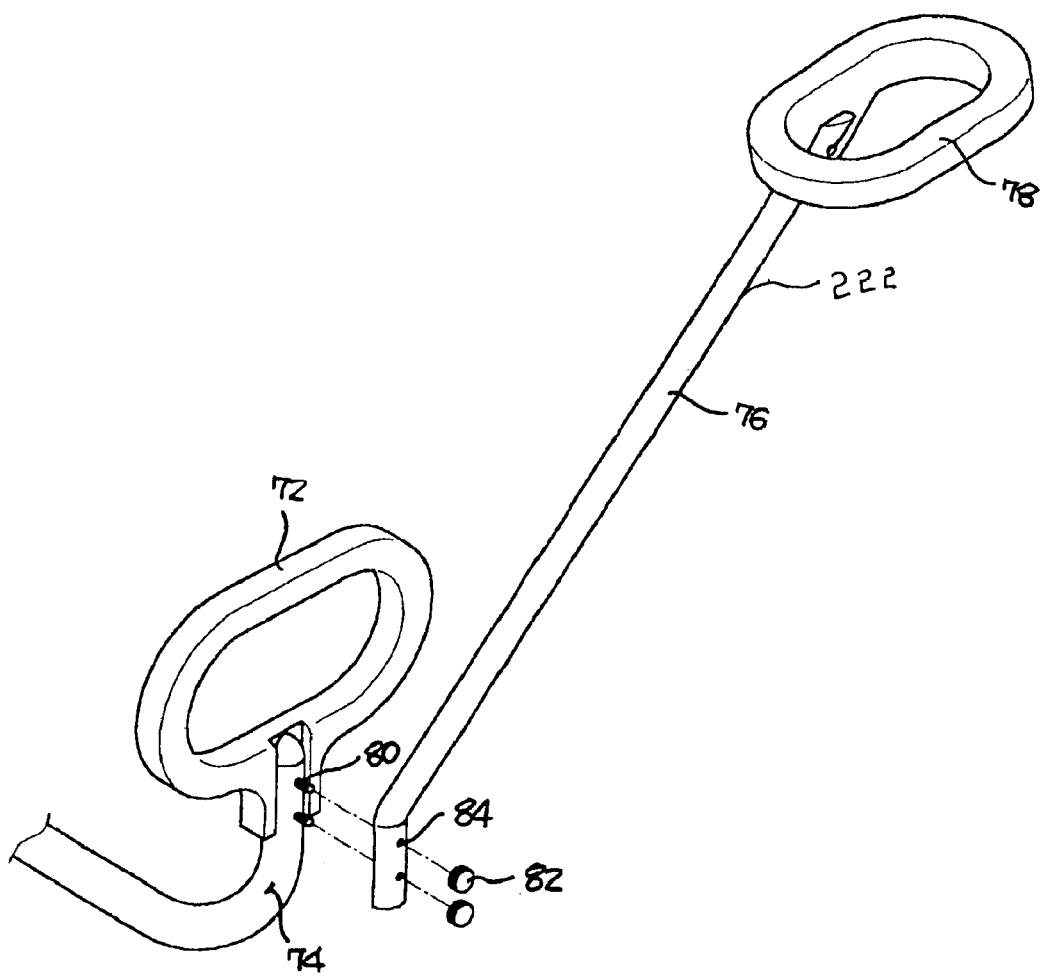
FIG. 4 is a perspective view showing a pushing bar.

As shown in FIG. 4, the foldable tricycle 100 further includes a back support 72 for supporting the back of a rider, and a pushing bar 222 for facilitating pushing of the foldable tricycle 100. The back support 72 is fixed to the center frame 10, and the pushing bar 222 is detachably attached to the back support 72. The pushing bar 222 includes a rod 76 that is attached to the back support 72 at one end and an elliptical handle 78 that is fixed to the other end of the rod 76.

A support frame 74, which supports the back support 72, is installed rearward on the center frame 10. The pushing bar 222 is detachably attached to the end of the support frame 74. In particular, two bolts 80 are installed to protrude from the end of the support frame 74, and the bolts 80 pass through holes 84 formed in the end of the rod 76, and engage with nuts 82.

Referring to FIGS. 5 and 6, how the tricycle 100 is folded is explained. First, the lever 42 is pivoted to disengage from the lock pin 26, thereby unlocking the four-bar link 200. Then the rear frame 14 is moved forward, to make the rear frame 14 pivot around the second pivot axis 24. When the rear frame 12 is moved forward toward the front wheel 96, by the operation of the four-bar link 200, the center frame 10 is pivoted forward around the first pivot axis 22, and the panels 32 are pivoted forward around the hole 17 in the front frame 12.

As the rear frame 14 is moved forward, the link pin 40 is moved out of the first lock recess 20 overcoming the force of the lock tension spring 34, and moves along the guide 16 until it is received in the second lock recess 18. In this way, the folded tricycle 100 is kept in the folded position shown in FIG. 6. The unfold the tricycle 100, the rear frame 14 is moved backward, and the link pin 40 is moved out of the second lock recess 18 overcoming the force of the lock tension spring 34.

With the above construction, due to the four-bar link 200 integrated into the center frame 10, the front frame 12, and the rear frame 14, the tricycle 100 is easily folded to a minimum size. The panels 32 and the guide 16 cover the pivoting parts, and prevent fingers or other body portions from being pinched between the pivoting parts.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A foldable tricycle comprising:
   a) a center frame;
   b) a front frame to which a front wheel is rotatably attached;
   c) a rear frame to which one or more rear wheels are rotatably attached;
   d) a four-bar link comprising a first bar, a second bar, a third bar, and a fourth bar;
   e) a handle bar for steering the foldable tricycle;
   f) a front wheel fork that rotatably supports the front wheel;
   g) a fastening member that fastens the handle bar the front wheel fork; and
   h) a front bearing member that rotatably supports the handle bar and the front wheel fork, and fixed to the front frame;
   wherein the first bar is integrated with the front frame, wherein the second bar is integrated with the center frame, wherein the third bar is integrated with the rear frame, wherein the fourth bar connects between the first bar and the third bar, wherein the four-bar link moves between a folded position in which the distance between the front wheel and the rear wheels is shortest, and a unfolded position in which the distance between the front wheel and the rear wheels is longest,
   wherein the fastening member, comprises an annular fastening body into which the handle bar and the front wheel fork are inserted, and a fastening element passes through a handle hole provided in the handle bar, a fork hole provided in the front wheel fork, and a fastening member hole provided in the fastening body.

2. The foldable tricycle of claim 1, wherein the front wheel fork further comprises an aligning recess, and the fastening member further comprises an aligning projection that engages with the aligning recess, wherein when the aligning projection is engaged with the aligning recess, the fork hole and the fastening member hole are aligned with each other.

3. The foldable tricycle of claim 2, wherein the fastening element comprises a bolt and a nut that engages with the bolt.

* * * * *